United States Patent [19]

Kawada et al.

[11] 4,333,042
[45] Jun. 1, 1982

[54] SYSTEM FOR DRIVING A MOTOR BY A PULSE WIDTH MODULATION INVERTER

[75] Inventors: Shigeki Kawada, Hino; Hiroshi Ishida, Hamuramachi, both of Japan

[73] Assignee: Fujitsu Fanuc Limited, Tokyo, Japan

[21] Appl. No.: 79,500

[22] Filed: Sep. 27, 1979

[30] Foreign Application Priority Data

Oct. 6, 1978 [JP] Japan .................................. 53/122731

[51] Int. Cl.³ .............................................. H02P 5/40
[52] U.S. Cl. .................................... 318/811; 318/801
[58] Field of Search ................................ 318/800–803, 318/807–812; 328/27; 307/261

[56] References Cited

U.S. PATENT DOCUMENTS 3,346,794 10/1967 Stemmler ............................ 318/810
3,353,081 11/1967 Stemmler ............................ 318/807
3,967,173 6/1976 Stich .................................... 318/811
4,227,138 10/1980 Espelage et al. ................... 318/808
4,247,890 1/1981 Cutler et al. ........................ 318/722

Primary Examiner—David Smith, Jr.
Assistant Examiner—G. Z. Rubinson
Attorney, Agent, or Firm—Armstrong, Nikaido, Marmelstein & Kubovcik

[57] ABSTRACT

A system for driving an alternate current motor including a pulse width modulation inverter having the two-range driving characteristics, wherein the motor is driven by the pulse width modulation output having a simulated sine wave form at the speed lower than the base speed of the motor and by the pulse width modulation output having a rectangular wave form at the speed higher than the base speed of the motor.

2 Claims, 5 Drawing Figures

Fig. IA
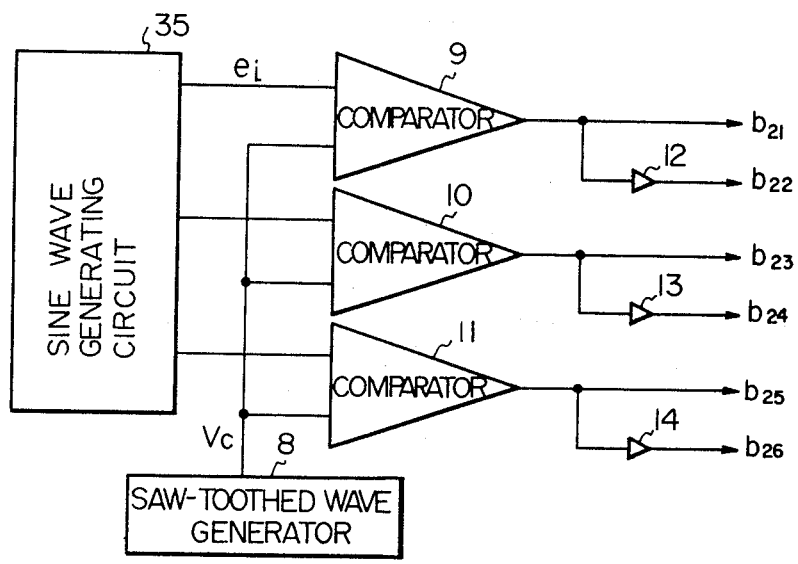
Fig. IB
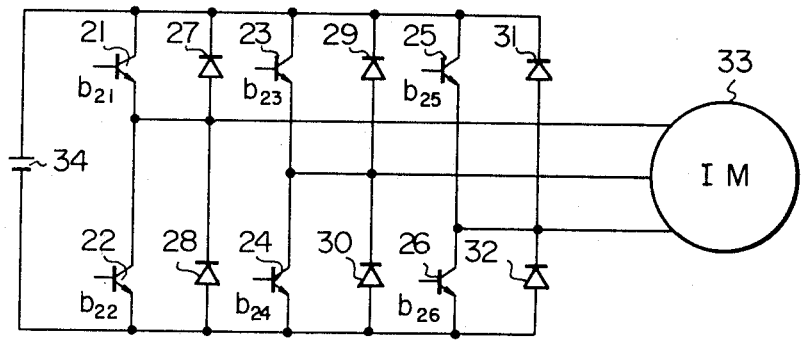

4,333,042

SYSTEM FOR DRIVING A MOTOR BY A PULSE WIDTH MODULATION INVERTER

TECHNICAL FIELD

The present invention relates to a system for driving a motor by a pulse width modulation (PWM) inverter. The present invention is applicable to, for example, a motor used in a system for controlling a numerically controlled machine tool.

BACKGROUND ART

It has been known that there is a system for driving an alternate current motor in which the whole speed range of the motor is divided into the following two ranges. That is, the A-range which is the range in which the speed of the motor is lower than the base speed and the motor is driven in accordance with the constant-torque characteristic and the B-range which is the range in which the speed of the motor is higher than the base speed and the motor is driven in accordance with the constant-power characteristic (FIG. 4). In the prior art, a system for driving a motor by a PWM inverter in the A- and B-range has been proposed. However, in this prior art, the torque of the motor in the A-range is not sufficient because the output voltage of the PWM inverter in the A-range is too low, and accordingly, it is difficult to realize a smooth running of the motor in the A-range. In addition, the transition of the running of the motor between the A- and B-ranges is not effected smoothly.

The present invention has been proposed in order to solve these problems in the system for driving a motor by a pulse width modulation (PWM) inverter for the A- and B-ranges. The above mentioned prior art is disclosed in, for example, the catalogue "Solid State Adjustable Frequency Drives TR 1000 and TR 3000 Series" issued by the PTI Controls Co. and the catalogue "Electronic Variable Frequency Drive-VFD Series" issued by the MIKI Pulley Co.

TECHNICAL PROBLEM AND SOLUTION THEREOF

It is the principal object of the present invention to obtain an excellent characteristic of driving an alternate current motor, based on a principle of effecting the sine wave type driving in the A-range and the rectangular wave type driving in the B-range using a pulse width modulation inverter as a driving source for the alternate current motor.

BRIEF DESCRIPTION OF DRAWINGS

FIGS. 1A and 1B illustrate a schematic diagram of the driving circuit for a motor used in an embodiment of the present invention, FIG. 1A illustrating the signals generating circuit each of which signals is applied to each of the bases of the transistors of the inverter of FIG. 1B, respectively;

DETAILED DESCRIPTION OF PREFERRED EMBODIMENTS

Figure 2:
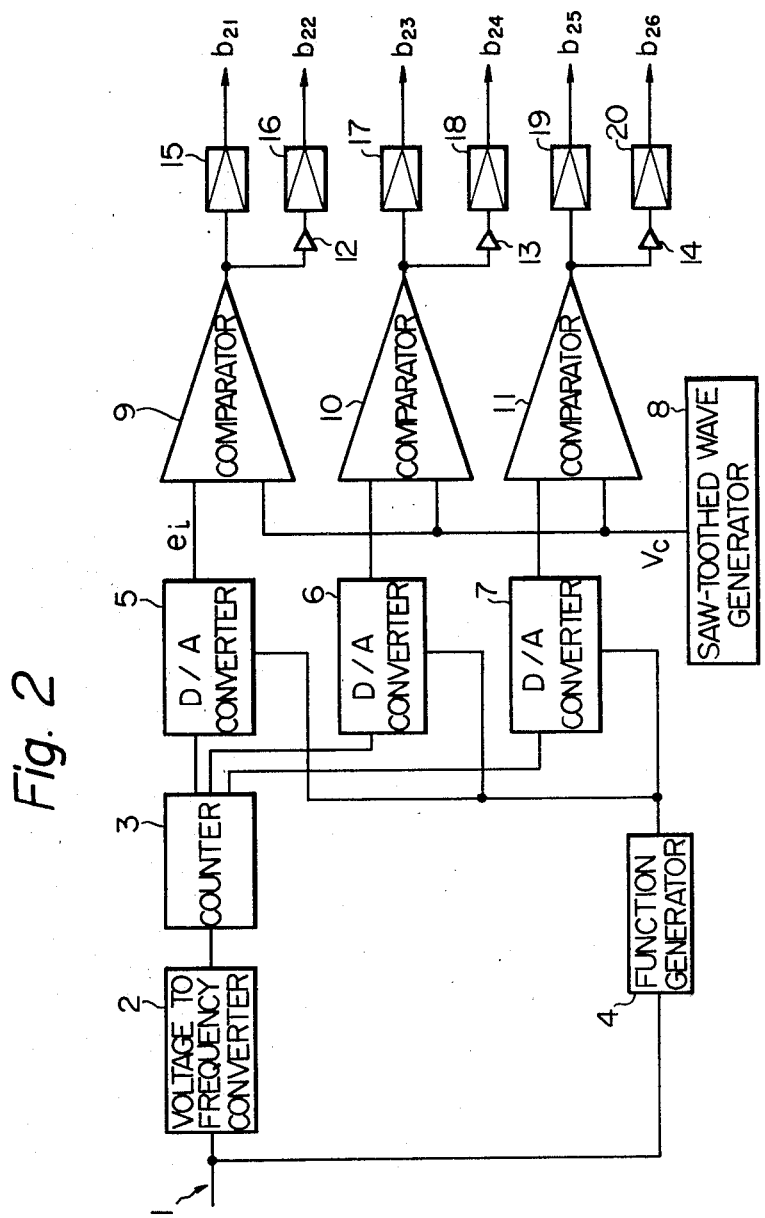
FIG. 2 illustrates a detailed diagram of the signals generating circuit of FIG. 1A.

In FIG. 1B, an alternate current motor (for example, an induction motor) 33 is driven by a power source through an inverter circuit consisting of the switching elements such as the transistors 21, 22, 23, 24, 25 and 26 and the rectifiers 27, 28, 29, 30, 31 and 32. The outputs of the signal generating circuit shown in FIG. 1A are applied to the bases $b_{21}$, $b_{22}$, $b_{23}$, $b_{24}$, $b_{25}$ and $b_{26}$ of the transistors 21, 22, 23, 24, 25 and 26 shown in FIG. 1B, respectively. The signal generating circuit shown in FIG. 1A consists of a sine wave generating circuit 35, a saw-toothed wave generating circuit 8, a plurality of comparators 9, 10 and 11, and a plurality of inverters 12, 13 and 14.

The sine wave output $e_i$ with the frequency f of the sine wave generating circuit 35 and the saw-toothed wave output $V_c$ with the frequency f' of the saw-toothed wave generating circuit 8 are compared in the comparators 9, 10 and 11. The HIGH level output is produced from the comparator when $V_c < e_i$, while the LOW level output is produced from the comparator when $V_c > e_i$. While the comparator is producing a HIGH level output, the transistor which receives this HIGH level output from said comparator as the base signal is rendered an ON state.

In the pulse width modulation inverter in the circuit shown in FIG. 1B, the voltage applied to the load of the motor is determined by the time duration in which the upper side transistor connected to the positive terminal of the power source and the lower side transistor connected to the negative terminal of the terminal are simultaneously rendered an ON state. The voltage applied to the motor changes linearly in accordance with the change of the ratio t/T, where t is a time duration in which the transistor is rendered an ON state and T is the chopper cyclic term. In the present invention, this relationship is utilized.

In FIG. 2, the details of the signal generating circuit of FIG. 1A is illustrated. The sine wave generating circuit consists of a voltage-to-frequency converter 2, a counter 3, a function generator 4 and a plurality of digital-to-analog converters 5, 6 and 7. To the input of the voltage-to-frequency converter 2 and the function generator a direct current signal 1 for commanding a frequency f is applied. A plurality of comparators 9, 10 and 11 receive the outputs of the digital-to-analog converters 5, 6 and 7 as the first inputs and the output of a saw-toothed wave generating circuit 8 as the second inputs. The drivers 15, 17 and 19 which supply outputs to the bases $b_{21}$, $b_{23}$ and $b_{25}$ of the transistors 21, 23 and 25 are connected to the outputs of the comparators 9, 10 and 11, respectively. The drivers 16, 18 and 20 which supply outputs to the bases $b_{22}$, $b_{24}$ and $b_{26}$ of the transistors 22, 24 and 26 are connected to the outputs of the comparators 9, 10 and 11 through the inverters 12, 13 and 14, respectively.

Figure 5:
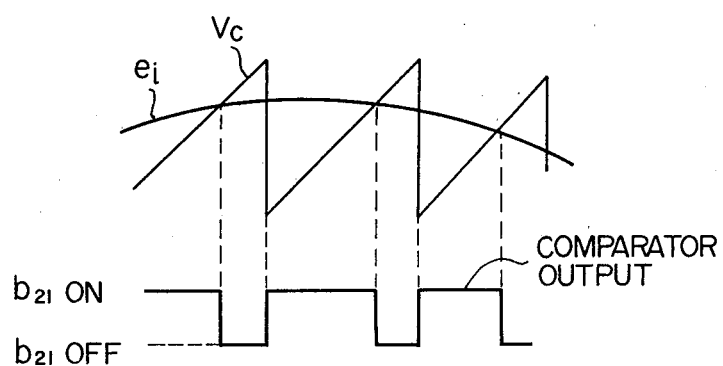
FIG. 5 illustrates the wave forms regarding the operation of the comparator.

In the circuit of FIG. 2, a sine wave signal $e_i$ with the frequency f and a saw-toothed carrier wave signal $V_c$ with the frequency f' is compared by the comparator 9 and a pulse signal is obtained at the output of the comparator 9, as illustrated in the wave forms illustrated in FIG. 5. The peak value of the sine wave $e_i$ is varied in accordance with the frequency f by means of the function generator 4. The transistors in the circuit of FIG. 1B are selectively caused to become conductive in accordance with the cut wave form as a result of the comparison between the signals $e_i$ and Vc by the comparators 9, 10 and 11.

Figure 3:
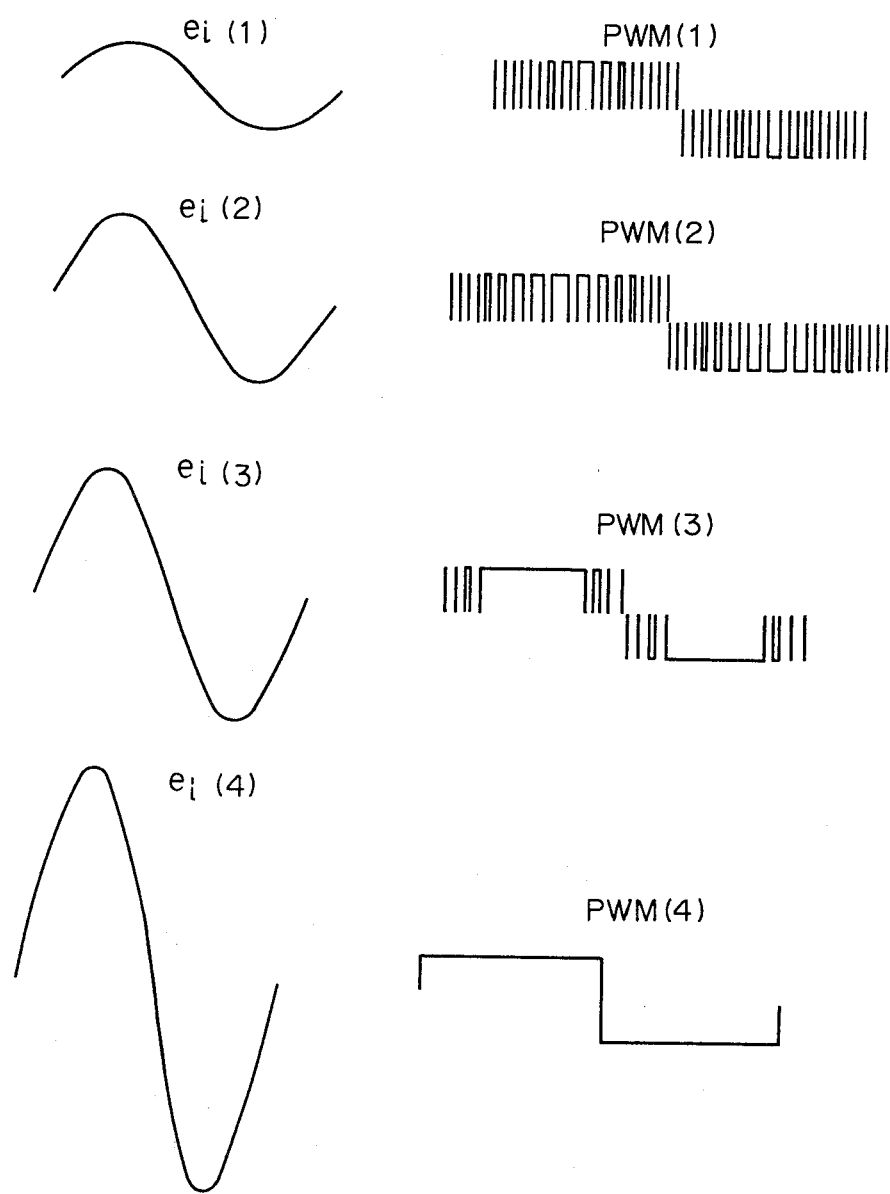
FIG. 3 illustrates the wave forms of the outputs of the inverter of FIG. 1B.

In FIG. 3, the wave forms of the sine wave signals $e_i$ (1), $e_i$ (2), $e_i$ (3) and $e_i$ (4) and the corresponding wave forms PWM (1), PWM (2), PWM (3) and PWM (4) of the output of the pulse width modulation inverter shown in FIG. 1B. This pulse width modulation inverter is driven by the signal generating circuit of FIG. 2.

Figure 4:
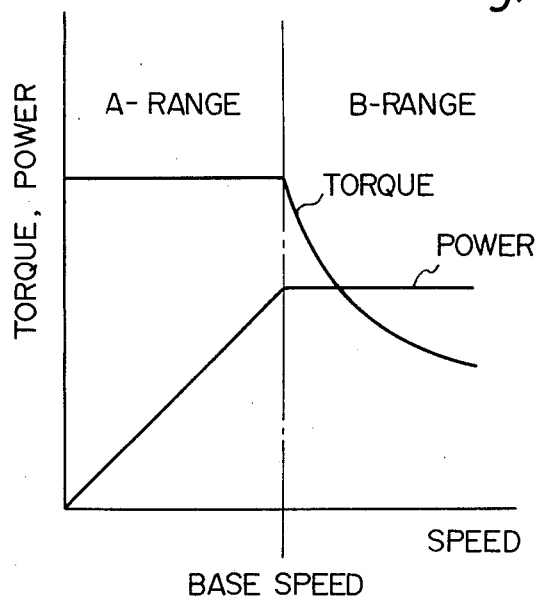
FIG. 4 illustrates the two-range driving characteristic of the motor.

When the motor is driven in the A-range (FIG. 4), the sine wave signal is expressed as the wave form $e_i$(1) or $e_i$(2) having a relatively small amplitude, and the corresponding wave form of the output of the pulse width modulation inverter is expressed as PWM (1) or PWM (2), respectively. This shows that, in the A-range, the motor is driven by the simulated sine wave voltage.

When the motor is driven in the B-range (FIG. 4), the sine wave signal is expressed as the wave form $e_i$(3) or $e_i$(4) having a relatively large amplitude, and the corresponding wave form of the output of the pulse width modulation inverter is expressed as PWM (3) or PWM (4), respectively. This shows that, in the B-range, the motor is driven by the rectangular wave voltage.

As illustrated in the wave forms of FIG. 3, in accordance with the circuit shown in FIGS. 1B and 2, a smooth running of the motor in the low speed is ensured because of the application of the simulated sine wave voltage to the motor, and the rate of utilization of the power source for the motor in the high speed region is kept at a high level because of the application of the rectangular wave voltage. In addition, the transition of the motor running between the A- and B-ranges are effected smoothly, and thus the continuous control over the entire range, including the A- and B-ranges, of the running of the motor is performed satisfactorily.

What is claimed is:

1. A system for driving an AC motor comprising:
   A DC power source,
   inverter means including a plurality of power transistors connected between said DC power source and said AC motor, for controlling the application of the power from said power source to said AC motor,
   a voltage to frequency converter means for receiving an analog voltage input signal which corresponds to a speed command signal for said motor and producing a sequence of pulses which is proportional to said analog voltage input signal,
   counter means for frequency dividing coupled to the output of said voltage to frequency converter means, for producing a signal of a frequency for driving said motor,
   digital to analog converter means for multiplying the output signal of said counter means by said analog voltage and producing an analog voltage sine wave signal,
   a saw-toothed wave generator means for providing a reference saw-toothed voltage which is independent of said analog voltage sine wave signal; and
   comparator means coupled to the outputs of said digital to analog converter means and said saw-toothed wave generator means, respectively, for comparing said analog voltage sine wave signal and said reference saw-toothed voltage, wherein the output signals of said comparator means directly control the operation of said plurality of power transistors in said inverter means.

2. In a system for driving an A.C. motor from a D.C. power source, wherein a pulse width modulation inverter means is connected between the power source and the motor, the motor having a first range of operation in which the torque of the motor is substantially constant while its speed increases up to a given base speed, and the motor further having a second range of operation in which the power of the motor is substantially constant as its speed increases above the base speed; a signal generating circuit means for controlling the inverter means and hence the motor, comprising, in combination,
   a sine wave generating circuit means, including
      a voltage-to-frequency converter means for receiving an input command signal, corresponding to the desired speed of the motor, and producing a series of pulses proportional to said input command signal,
      counter means coupled to the output of said voltage-to-frequency converter means for producing a digital output proportional to the frequency of said pulses,
      digital-to-analog converter means coupled to the output of said counter means for producing a sine wave analog voltage,
   a saw-toothed wave generator means, independent of said sine wave generating circuit, for producing a predetermined saw-toothed reference voltage,
   comparator means coupled to the outputs of said sine wave generating circuit means and said saw-toothed wave generator means, respectively, for comparing said sine wave analog voltage against said saw-toothed reference voltage, and
   means coupling the output of said comparator means directly to the inverter means,
   whereby, when the amplitude of said sine wave analog voltage is relatively small, the motor is driven in its first range of operation by a series of pulses substantially simulating a sine wave voltage, and
   whereby when the amplitude of said sine wave analog voltage is relatively large, the motor is driven in its second range of operation by a substantially rectangular-wave voltage,
   thereby providing for a smooth operation of the motor with sufficient torque in its first range of operation, and thereby effecting a smooth transition from the first to the second range of motor operation.

* * * * *